US012599063B2

(12) United States Patent
Jones

(10) Patent No.: US 12,599,063 B2
(45) Date of Patent: Apr. 14, 2026

(54) UTILITY VEHICLE HAY FORK ATTACHMENT DEVICE

(71) Applicant: Greg Jones, Hermiston, OR (US)

(72) Inventor: Greg Jones, Hermiston, OR (US)

( * ) Notice: Subject to any disclaimer, the term of this patent is extended or adjusted under 35 U.S.C. 154(b) by 1115 days.

(21) Appl. No.: 17/586,133

(22) Filed: Jan. 27, 2022

(65) Prior Publication Data

US 2022/0279725 A1     Sep. 8, 2022

Related U.S. Application Data

(60) Provisional application No. 63/156,646, filed on Mar. 4, 2021.

(51) Int. Cl.
A01D 87/12 (2006.01)
A01D 87/00 (2006.01)

(52) U.S. Cl.
CPC ....... A01D 87/122 (2013.01); A01D 87/0053 (2013.01)

(58) Field of Classification Search
CPC .............. A01D 87/0053; A01D 87/122; A01D 87/126; A01D 87/127
See application file for complete search history.

(56) References Cited

U.S. PATENT DOCUMENTS

| | | | | | |
|---|---|---|---|---|---|
| 3,897,880 | A | * | 8/1975 | Waske ................. | A01D 87/127 |
| | | | | | 414/24.5 |
| 2007/0166138 | A1 | * | 7/2007 | Brooks ................... | B66F 9/082 |
| | | | | | 414/471 |
| 2012/0045297 | A1 | * | 2/2012 | Smith ................. | A01D 87/127 |
| | | | | | 414/800 |
| 2012/0308340 | A1 | * | 12/2012 | Price .................... | A01D 87/126 |
| | | | | | 414/24.5 |

FOREIGN PATENT DOCUMENTS

GB          2518127 A  *  3/2015  ........... A01D 87/126

* cited by examiner

*Primary Examiner* — Joseph M Rocca
*Assistant Examiner* — Ashley A Kaercher
(74) *Attorney, Agent, or Firm* — Brennan, Manna & Diamond, LLC

(57) ABSTRACT

The present invention relates to a utility vehicle hay fork attachment device that is comprised of a frame assembly further comprised of at least one horizontal frame member with at least one tine, a mounting plate, and a pair of mounting arms. The device further preferably resembles a garden fork and is made of a metal, such that it can carry strong loads and resist wear from repeated uses. The device is also comprised of mounting arms and a mounting ring that allow multiple means of attachment and support to a vehicle. In this manner, the device can be applied to any utility or all-terrain vehicle known in the art, to decrease the amount of time and effort required for moving hay bales.

8 Claims, 3 Drawing Sheets

UTILITY VEHICLE HAY FORK ATTACHMENT DEVICE

CROSS-REFERENCE TO RELATED APPLICATION

The present application claims priority to, and the benefit of, U.S. Provisional Application No. 63/156,646, which was filed on Mar. 4, 2021 and is incorporated herein by reference in its entirety.

FIELD OF THE INVENTION

The present invention relates generally to the field of utility vehicle attachments. More specifically, the present invention relates to a utility vehicle hay fork attachment device that is comprised of a frame assembly further comprised of at least one horizontal frame member with at least one tine, a mounting plate and a pair of mounting arms. The device can be applied to any utility or all-terrain vehicle known in the art to decrease the amount of time and effort required for moving hay bales. Accordingly, the present disclosure makes specific reference thereto. Nonetheless, it is to be appreciated that aspects of the present invention are also equally applicable to other like applications, devices and methods of manufacture.

BACKGROUND

Bales of hay, feed, alfalfa, etc., are typically found at agricultural locations, such as farmland. During and after a harvest, said bales typically need moved to a secondary storage area, such as a barn. However, manually picking up a bale and moving it can be incredibly difficult and physically demanding. A bale may be of awkward shape and significant weight, thus requiring considerable strength and dexterity to transport it. This kind of work can be incredibly difficult, time-consuming and potentially dangerous as repeatedly bending down to pick up and transport a bale may result in serious injury if done improperly or without the proper equipment. However, many people lack proper equipment (such as tractors) or a simple means to move bales.

Therefore, there exists a long-felt need in the art for a device that allows a user to easily move one or more bales of hay. There also exists a long-felt need in the art for a utility vehicle hay fork attachment device that can be attached to a four-wheeler or other utility vehicle to allow a user to move one or multiple bales of hay using the vehicle. Further, there exists a long-felt need in the art for a utility vehicle hay fork attachment device capable of lifting, transporting and placing bales of hay, feed, alfalfa and other items commonly configured as bales. In addition, there exists a long-felt need in the art for a utility vehicle hay fork attachment device capable of transporting bales conveniently and efficiently, without requiring substantial physical effort on the part of the user.

The subject matter disclosed and claimed herein, in one embodiment thereof, comprises a utility vehicle hay fork attachment device. The device is comprised of a frame assembly further comprised of at least one horizontal frame member with at least one tine, a mounting plate and a pair of mounting arms. The device further preferably resembles a garden fork and is made of a strong and durable metal, such that it can be used to transport heavy bales of hay. The device is also comprised of a mounting arm that allows the device to attach to the underside of a vehicle and a mounting ring that allows the device to attach to the winch assembly of a vehicle, wherein the winch assembly provides additional stability and/or function to the device. In this manner, the device can be applied to any utility or all-terrain vehicle known in the art and can be used to move one or more bales of hay, thus decreasing the amount of time and effort required for moving hay bales.

In this manner, the utility vehicle hay fork attachment device of the present invention accomplishes all the forgoing objectives and provides an improved means to transport bales of hay. Further, the device interfaces with utility vehicles, such that it can transport bales without requiring physical exertion on the part of the user. In addition, the device lifts, transports and places bales of hay, feed, alfalfa, and other items commonly configured as bales in a convenient and efficient manner.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a utility vehicle hay fork attachment device. The device is comprised of a frame assembly further comprised of at least one horizontal frame member with at least one tine, a mounting plate and a pair of mounting arms. In differing embodiments, the device may have the general appearance of a garden fork with multiple tines. The device may also be made of a plurality of strong and durable materials commonly used for making large equipment. However, the device is preferably made of a metal.

The frame assembly is comprised of at least one mounting arm that attaches the device to the underside of a vehicle. The mounting arms are attached to a horizontal frame member via a mounting plate. In differing embodiments, the mounting plate is further comprised of a hinge, allowing the horizontal frame member to tilt upwards and downwards when transporting and setting in place bales of hay. The horizontal frame member is further comprised of a mounting ring and at least one tine. The mounting ring provides additional support to the device by receiving a hook of a winch assembly of an ATV. By increasing and/or decreasing tension in the winch assembly, the horizontal frame member may tilt up and down in the embodiment of the device with a hinge. In a non-hinged embodiment, the winch assembly simply provides tension and stability to ensure the device remains in a position parallel with a ground surface. To easily transport a bale of hay using the device, the at least one tine extends from the horizontal frame member to pierce the bale and grab hold of it. In another potential embodiment, the mounting plate may be placed in a vertical track with an internal pulley system, such that the horizontal frame member can raise/lower a hay bale by increasing or decreasing tension in the winch assembly.

Accordingly, the utility vehicle hay fork attachment device of the present invention is particularly advantageous as it provides an improved means to transport bales of hay without requiring significant physical exertion on the part of the user. Further, the device can universally attach to any utility vehicle in a manner that does not require complex assembly or effort. In addition, the device lifts, transports, and sets in place bales of hay, feed and other items commonly configured as bales in a convenient and efficient manner. In this manner, the utility vehicle hay fork attachment device overcomes the limitations of existing hay forks known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
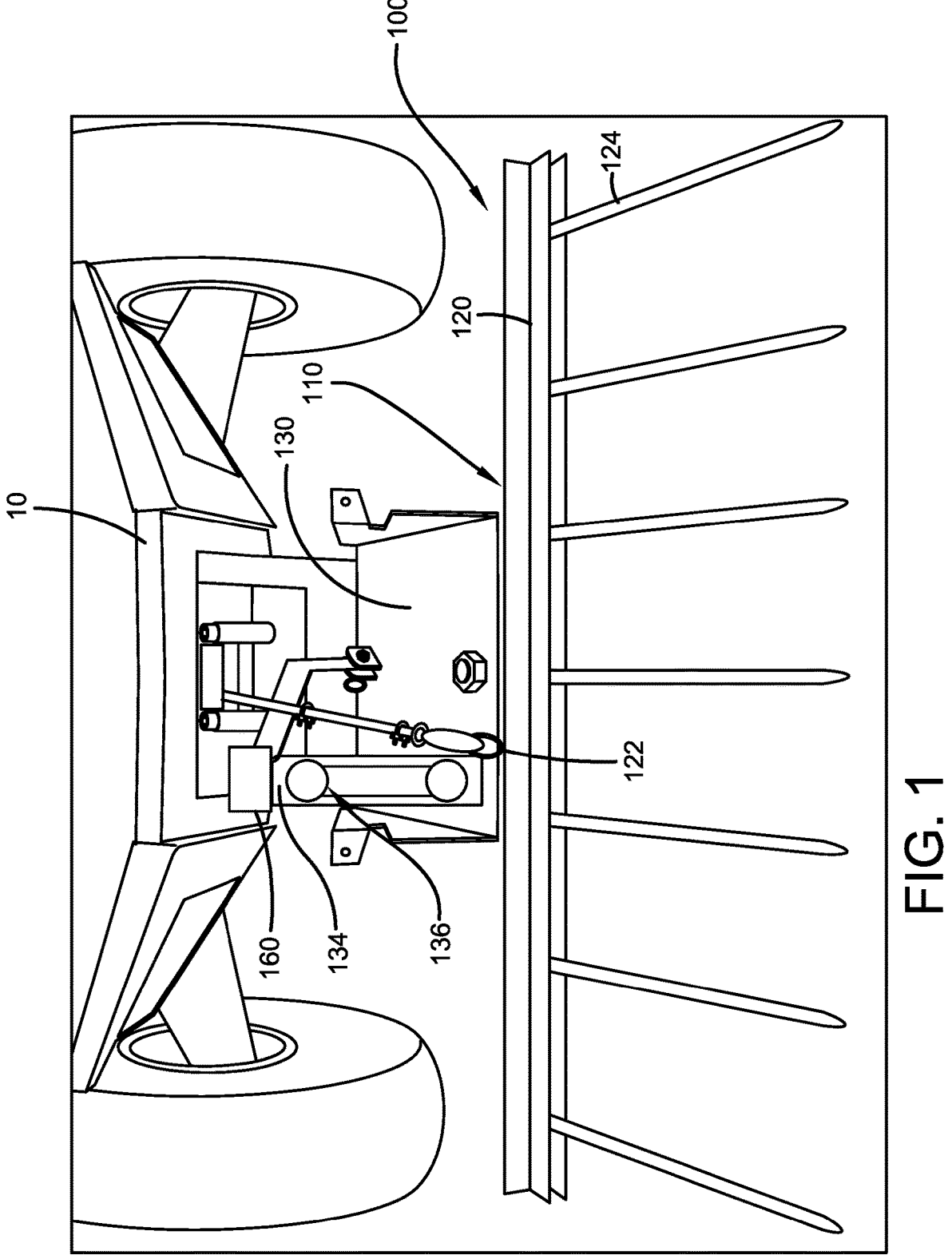
FIG. 1 illustrates a front view of one potential embodiment of the utility vehicle hay fork attachment device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved utility vehicle hay fork attachment device that can interface with a four-wheeler or other utility vehicle. Further, there exists a long-felt need for such a device that is also capable of lifting, transporting and placing bales of hay, feed, alfalfa and other items commonly configured as bales. In addition, there exists a long-felt need in the art for a hay bale transportation device capable of transporting bales conveniently and efficiently.

The present invention, in one exemplary embodiment, is comprised of a utility vehicle hay fork attachment device that attaches to a utility vehicle and allows bales of hay, feed, alfalfa and other similar items to be transported without putting significant physical strain on a user's body. The device is primarily comprised of a frame assembly further comprised of at least one horizontal frame member with at least one tine, a mounting plate and a pair of mounting arms. In differing embodiments, the device may have the general appearance of a garden fork and preferably is comprised of multiple tines capable of penetrating bales of hay. The device may also be made of a plurality of strong and durable materials, but is preferably made of a metal commonly used in large machinery. In addition, any surface of the device may be comprised of a plurality of indicia, such as patterns, logos, emblems, images, symbols, designs, letters, words, characters, animals, advertisements, brands, etc.

Further, the device may attach to a four-wheeler, utility vehicle, or other wheeled vehicle known in the art. At least one mounting arm extends from the frame assembly to the underside of an ATV. The mounting arm may be fixedly or removably-attached to the ATV. The other side of the mounting arm attaches to at least one mounting plate of the frame assembly. The mounting plate connects the mounting arm to at least one horizontal frame member from which the at least one tine extends. The tines extend outward, away from the ATV, such that they can penetrate a hay bale. In addition, a mounting ring is fixedly-attached to the horizontal frame member which then connects to a hook from a winch assembly of an ATV, to provide additional support and stability, to keep the device in a position parallel to the ground surface.

In one potential embodiment of the device, the mounting plate attaches to the horizontal frame member via at least one hinge, such that the device may tilt up or down to better transport the bales of hay. In this embodiment, the winch assembly may tighten and thus pull on the mounting ring to raise the hay bale or loosen and thus relieve tension in the winch assembly to lower the hay bale. In another potential embodiment, the mounting plate may be mounted to a track with an internal pulley system, such that the frame assembly may be raised vertically when the tines are penetrating the hay bale to better transport the hay bale. In this embodiment, a winch assembly or motor may be used to move the frame assembly up or down along the track.

Accordingly, the utility vehicle hay fork attachment device of the present invention is particularly advantageous as it provides an improved means to transport bales of hay. Further, the device lifts, transports and sets in place bales of hay, feed, alfalfa and other items commonly configured as bales. In addition, the device can universally attach to any utility vehicle, such that bales may be moved in a convenient and efficient manner. Therefore, the device overcomes the limitations of manually moving bales of hay.

Referring initially to the drawings, FIG. 1 illustrates a front view of one embodiment of the utility vehicle hay fork attachment device 100 of the present invention while attached to an ATV 10 (shown as prior art). The device 100 is comprised of a frame assembly 110 further comprised of at least one horizontal frame member 120 with at least one tine 124, and at least one mounting plate 130, and a pair of mounting arms 140. In differing embodiments, the device 100 may have the general appearance of a plurality of tined garden tools such as, but not limited to, a rake, a hoe, an aerator, a cultivator, a fork, etc., or any other tined garden tool as is known in the art. Further, the device 100 may be manufactured of a plurality of strong and durable materials commonly used in large machinery and equipment such as, but not limited to, stainless steel, aluminum, cast iron, iron, copper, brass, carbon alloys, etc., or any other suitable material as is known in the art. Furthermore, any surface of the device 100 may be comprised of any number of indicia 150 in the form of patterns, logos, emblems, images, symbols, designs, letters, words, characters, animals, advertisements, brands, etc., or an other suitable indicia as is known in the art.

Figure 2:
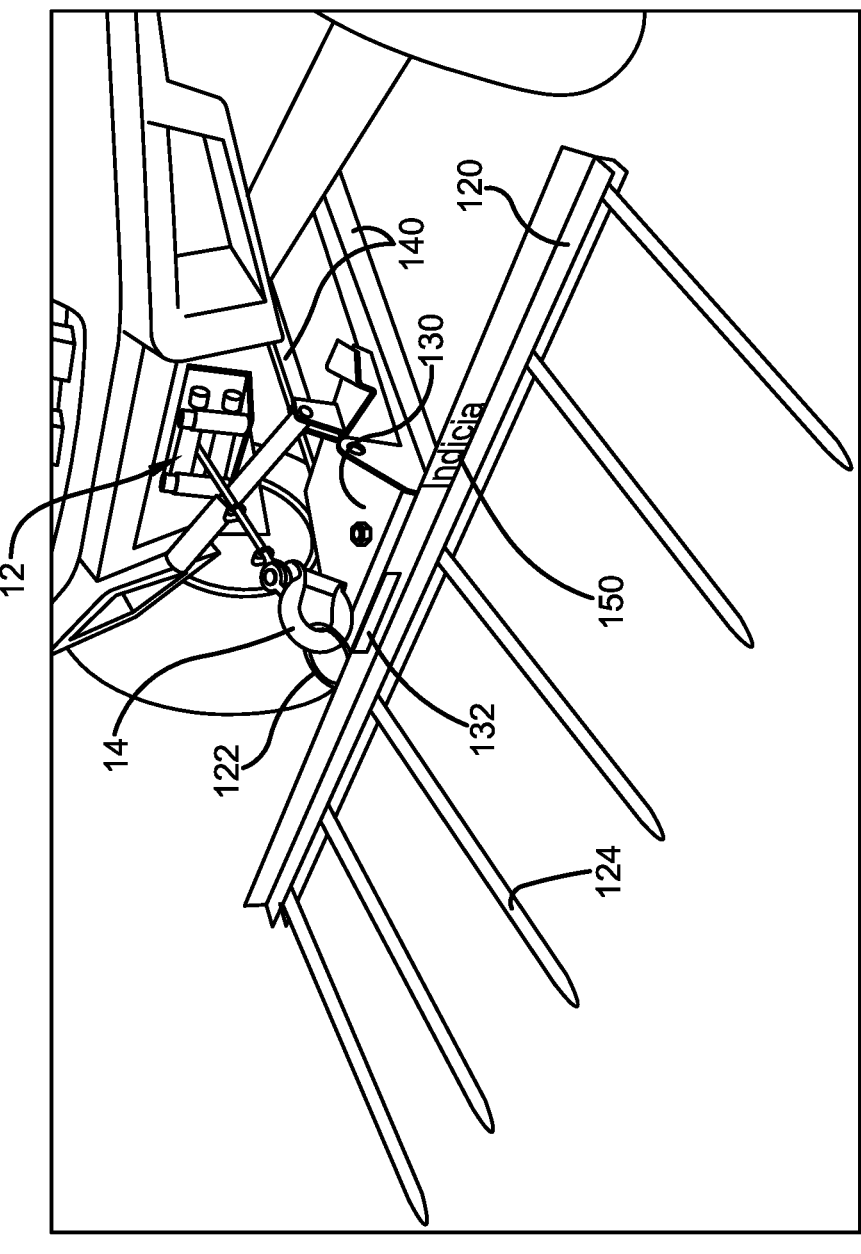
FIG. 2 illustrates a perspective view of one potential embodiment of the utility vehicle hay fork attachment device of the present invention while attached to an ATV in accordance with the disclosed architecture.
Figure 3:
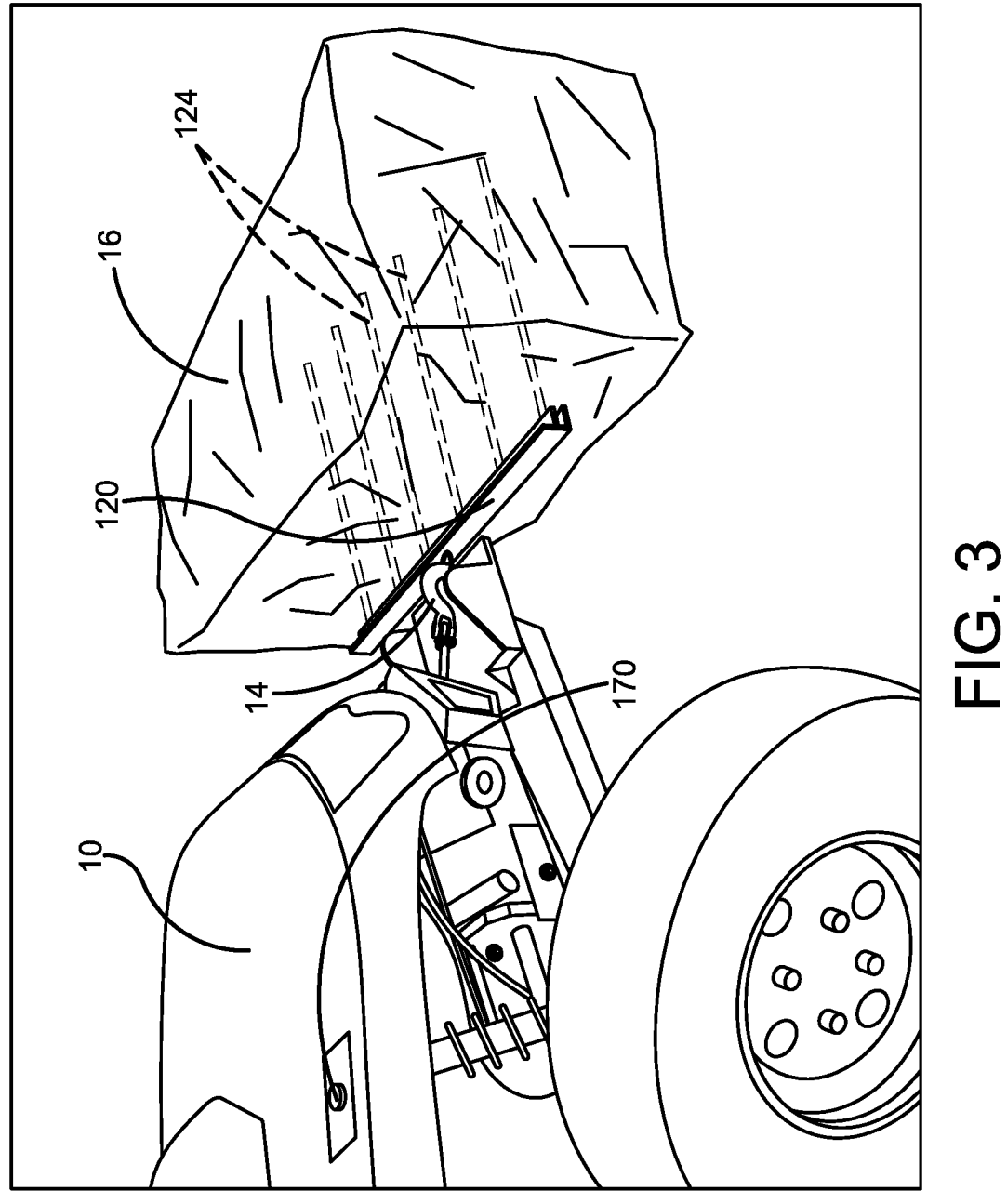
FIG. 3 illustrates a perspective view of one potential embodiment of the utility vehicle hay fork attachment device of the present invention while being used to transport a hay bale in accordance with the disclosed architecture.

In the preferred embodiment of the device 100 shown in FIGS. 1-3, the device 100 attaches to an ATV (All-Terrain Vehicle) 10. However, in differing embodiments, the device 100 could also be attached to any other suitable vehicle as is known in the art, such as an automobile, a golf cart, a UTV, a side-by-side, a tractor, or any other suitable wheeled-vehicle known in the art. A pair of mounting arms 140 are further fixedly (i.e., welded) or removably attached (via at least one suitable fastener) to the underside of the ATV 10. The mounting arms 140 connect to at least one horizontal frame member 120 of a frame assembly 110 via at least one mounting plate 130. Further, at least one tine 124 extends outwards from the horizontal frame member 120, such that the tine 124 can penetrate a body of a hay bale 16 (shown in FIG. 3). In differing embodiments, multiple horizontal frame members 120 may be attached to the frame assembly 110 at different heights to grab multiple hay bales 16 stacked on top of one another. In addition, at least one mounting ring 122 is fixedly-attached to the horizontal frame member 120, such that the frame member 120 can attach to a hook 14 of a winch assembly 12 (shown in FIG. 2) on the ATV 10 and provide additional support (i.e., tensions) to keep the device 100 in a position parallel with a ground surface.

As best seen in FIG. 2, increasing tension in the winch assembly 12 pulls the hook 14 on the mounting ring 122 of the horizontal frame member 120, thus causing the frame assembly 110 to angle slightly upwards. Increasing tension in the winch assembly 12 is most effective when transporting a hay bale 16, such that any bumps in the terrain do not detach the hay bale 16 from the tines 124 of the device 100. Further, decreasing tension in the winch assembly 12 may tilt the frame assembly 110 downwards, which is most effective when penetrating or placing a hay bale 16.

FIG. 3 illustrates a perspective view of one embodiment of the utility vehicle hay fork attachment device 100 of the present invention while being used to transport a hay bale 16 in accordance with the disclosed architecture. As noted, the tines 124 penetrate the hay bale 16, such that the hay bale 16 is attached to the ATV 10 and can easily be transported to a desired location. In one potential embodiment of the device 100, the mounting plate 130 is attached to the horizontal frame member 120 with at least one hinge 132. The at least one hinge 132 may be any suitable hinge type known in the art such as, but not limited to, an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, etc. In an embodiment with at least one hinge 132, the hinge 132 may allow the frame assembly 110 to tilt up or down by increasing or decreasing tension on the winch assembly 12 (i.e., extending or retracting the assembly 12 from the ATV 10).

In another embodiment of the device 100, a vertical track 134 (shown in FIG. 1) may be attached to the mounting plate 130, wherein the track 134 has an internal pulley system 136 that is powered by the winch assembly 12 (wherein the hook 14 of the winch assembly 12 attaches to the pulley system 136) or by a gas or electric motor 160 that can be activated by at least one button 170 (shown in FIG. 3) positioned at a location on the ATV 10. The horizontal frame member 120 is further fixedly or removably-attached to the track 134. In this manner, after the tines 124 penetrate a hay bale 16 the winch assembly 12 may be tightened, thus moving the pulley system 136 and causing the frame member 120 to move upwards along the vertical track 134 to lift an attached hay bale 16. Further, decreasing tension in the winch assembly 12 may lower the member 120 along the vertical track 134 to penetrate or set a hay bale 16 in place. In this manner, the track 134 allows the frame member 120 (and any hay bale 16 attached to the tines 124) to move upwards/downwards in elevation, similar in operation to the forks of a conventional forklift.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "utility vehicle hay fork attachment device" and "device" are interchangeable and refer to the utility vehicle hay fork attachment device 100 of the present invention.

Notwithstanding the forgoing, the utility vehicle hay fork attachment device 100 of the present invention and its various components can be of any suitable size and configuration as are known in the art without affecting the overall concept of the invention, provided that they accomplish the above-stated objectives. One of ordinary skill in the art will appreciate that the size, configuration and material of the utility vehicle hay fork attachment device 100 as shown in FIGS. 1-3 is for illustrative purposes only, and that many other sizes and shapes of the utility vehicle hay fork attachment device 100 are well within the scope of the present disclosure. Although the dimensions of the utility vehicle hay fork attachment device 100 are important design parameters for user convenience, the utility vehicle hay fork attachment device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A utility vehicle hay fork attachment device comprising:

a frame assembly further comprised of:

at least one mounting plate further comprised of a vertical track with a pulley system;

at least one horizontal frame member further comprised of at least one hinge that allows the at least one horizontal frame member to attach to the at least one mounting plate;

at least one mounting ring connected to the at least one horizontal frame member;

at least one tine that extends outwards from the at least one horizontal frame member, wherein the at least one tine can penetrate a body of a hay bale to be lifted; and a pair of mounting arms that attach to the at least one mounting plate.

2. The utility vehicle hay fork attachment device of claim 1, wherein the utility vehicle hay fork attachment device is sized and configured to be attached to an ATV, an automobile, a golf cart, a UTV, a side by side, a tractor, or a wheeled vehicle that has a winch assembly.

3. The utility vehicle hay fork attachment device of claim 2, wherein the mounting ring receives a hook of the winch assembly.

4. The utility vehicle hay fork attachment device of claim 3, wherein the winch assembly can be used to apply tension to the mounting ring, such that the utility vehicle hay fork attachment device remains in a position parallel to a ground surface.

5. The utility vehicle hay fork attachment device of claim 4, wherein the at least one hinge allows the frame assembly to tilt up or down by increasing or decreasing tension on the winch assembly.

6. The utility vehicle hay fork attachment device of claim 5, wherein the pulley system is powered by a winch assembly.

7. The utility vehicle hay fork attachment device of claim 6, wherein the vertical track is attached to the at least one horizontal frame member.

8. The utility vehicle hay fork attachment device of claim 7, wherein the winch assembly is used to move the pulley system which moves the at least one horizontal frame member up or down the vertical track.

* * * * *